United States Patent [19]

Kino et al.

[11] 4,013,834
[45] Mar. 22, 1977

[54] GHOST SIGNAL ERASING SYSTEM
[75] Inventors: Yoshihiro Kino, Machida; Nobuaki Furuya, Tokyo; Mitsuru Asanuma, Machida, all of Japan
[73] Assignee: Matsushita Electric Industrial Co., Ltd., Osaka, Japan
[22] Filed: Apr. 17, 1975
[21] Appl. No.: 568,834
[30] Foreign Application Priority Data
Apr. 18, 1974 Japan .............................. 49-44071
[52] U.S. Cl. ........................ 358/166; 178/DIG. 44; 333/30 R; 310/9.8; 310/8.1
[51] Int. Cl.² ..................... H04N 5/44; H03H 7/30; H01V 7/00
[58] Field of Search ............. 178/DIG. 12, DIG. 44, 178/7.3 R; 333/70 T, 72, 71, 29, 30 R; 310/9.8, 8.1

[56] References Cited
UNITED STATES PATENTS

| 2,448,635 | 9/1948 | Smith | 178/DIG. 44 |
| 3,479,572 | 11/1969 | Pokorny | 333/72 |
| 3,482,168 | 12/1969 | Sasao | 178/DIG. 44 |
| 3,749,984 | 7/1973 | Benyon et al. | 333/30 R |
| 3,818,379 | 6/1974 | Wauk | 333/30 R |
| 3,894,251 | 7/1975 | Shibayama | 310/9.8 |

Primary Examiner—John C. Martin
Attorney, Agent, or Firm—Stevens, Davis, Miller & Mosher

[57] ABSTRACT

A ghost signal erasing system for television receivers in which a variable delay element utilizing the propagation of an elastic surface wave is used. The variable delay element includes a piezoelectric substrate, a plurality of first interdigitated electrode pairs formed on the substrate and a plurality of second interdigitated electrode pairs also formed on the substrate. An elastic surface wave produced by applying a video i-f signal to the first interdigitated electrode pairs is propagated along the surface of the piezoelectric substrate and taken up at the second interdigitated electrode pairs as a delayed a-c signal. By switching the first and second interdigitated electrode pairs to change the combination thereof, various delay times are obtained.

2 Claims, 5 Drawing Figures

GHOST SIGNAL ERASING SYSTEM

This invention relates to systems for erasing ghost signals that occur in the reception of television signals and, more particularly, to ghost signal erasing systems which use a delay element making use of elastic surface waves.

Television or similar signal transmission systems wherein electromagnetic waves propagated through air are intercepted by a receiver antenna, are generally affected by the phenomenon of ghosting which greatly deteriorates picture quality. A wave transmitted by a broadcast station or the like may arrive at an antenna of a television or other receiver either directly or after being reflected by large buildings, mountains, iron towers or other objects, and the phenomenon of ghosting results from reflected waves which are delayed in reaching the antenna. In the case of a television receiver, for instance, the reproduced picture consists of two images if there is a single ghost image and multiple images if there are many ghost images. In the twofold reception of a signal, the ghost image is displaced from the original in proportion to the delay time of the reflected wave being received and the intensity of the ghost signal varies with the signal intensity of the reflected wave. In general, the delay time of a reflected wave giving rise to a ghost signal is up to several tens of microseconds. The deterioration of the quality of the received picture is appreciable if the reflected wave received after reflection by a building or other structure exceeds 10 percent in intensity with respect to the direct wave which is received without being reflected.

As a measure to solve the problem of deterioration of picture quality due to ghosting, it has heretofore been contemplated to delay the direct wave with respect to a reflected wave by means of a delay element for the same time interval as the delay time of the reflected wave so as to electrically cancel the reflected wave by combining it with the delayed wave after appropriate intensity adjustment and polarity inversion of the latter, thereby removing the ghosting. This method, however, has had some difficiencies which will be discussed hereinafter.

The delay time of a reflected wave, giving rise to a ghost signal, with respect to the direct wave varies with the distance of the reflecting object, and hence the time for which to delay the direct wave is not fixed. This means that a delay element capable of providing variable delay time is necessary. However, a delay element which is capable of delaying a signal for a desired period ranging up to about several tens of microseconds is not available. Although there is no single variable delay element which is suited to this end, it is possible to construct a cascade connection of a plurality of delay elements providing different delay times (for instance those utilizing an elastic wave through a solid) to provide a required delay time coverage; for instance, seven such elements with respective delay times of 0.1 $\mu$ sec, 0.2 $\mu$ sec, 0.4 $\mu$ sec, 0.8 $\mu$ sec, 1.6 $\mu$ sec, 3.2 $\mu$ sec and 6.4 $\mu$ sec may be arranged in appropriate cascade connection to provide for a 0.1 $\mu$ sec step coverage of delay times up to 12.7 $\mu$ sec. However, such an arrangement requires a number of elements, leading to high cost and large size of the overall construction. Also, the frequency characteristics and loss will greatly vary depending upon the number of connections involved.

An object of the invention is to provide a ghost signal erasing system, which has a small size and high performance and is nevertheless simple in construction.

To solve the afore-mentioned problems, the ghost signal erasing system according to the invention features the use of a delay element utilizing elastic surface waves. A delay element making use of elastic waves through a solid cannot provide variable delay time due to the fact that the delay time is determined by the length of the material serving as the delaying medium. In contrast, a delay element utilizing elastic surface waves can be provided with intermediate taps and hence various delay times are obtained corresponding to different tap positions. Thus it can provide a large number of variable delay times.

For example, for the removal of ghost signals in television signals even a variable delay element whose delay time is variable not continuously but stepwise with a step of 0.1 $\mu$ sec is sufficiently effective. However, it is impossible to realize a delay element having a 0.1 $\mu$ sec step coverage of delay time up to 32 $\mu$ sec with delay elements utilizing elastic waves through a solid.

Figure 1:
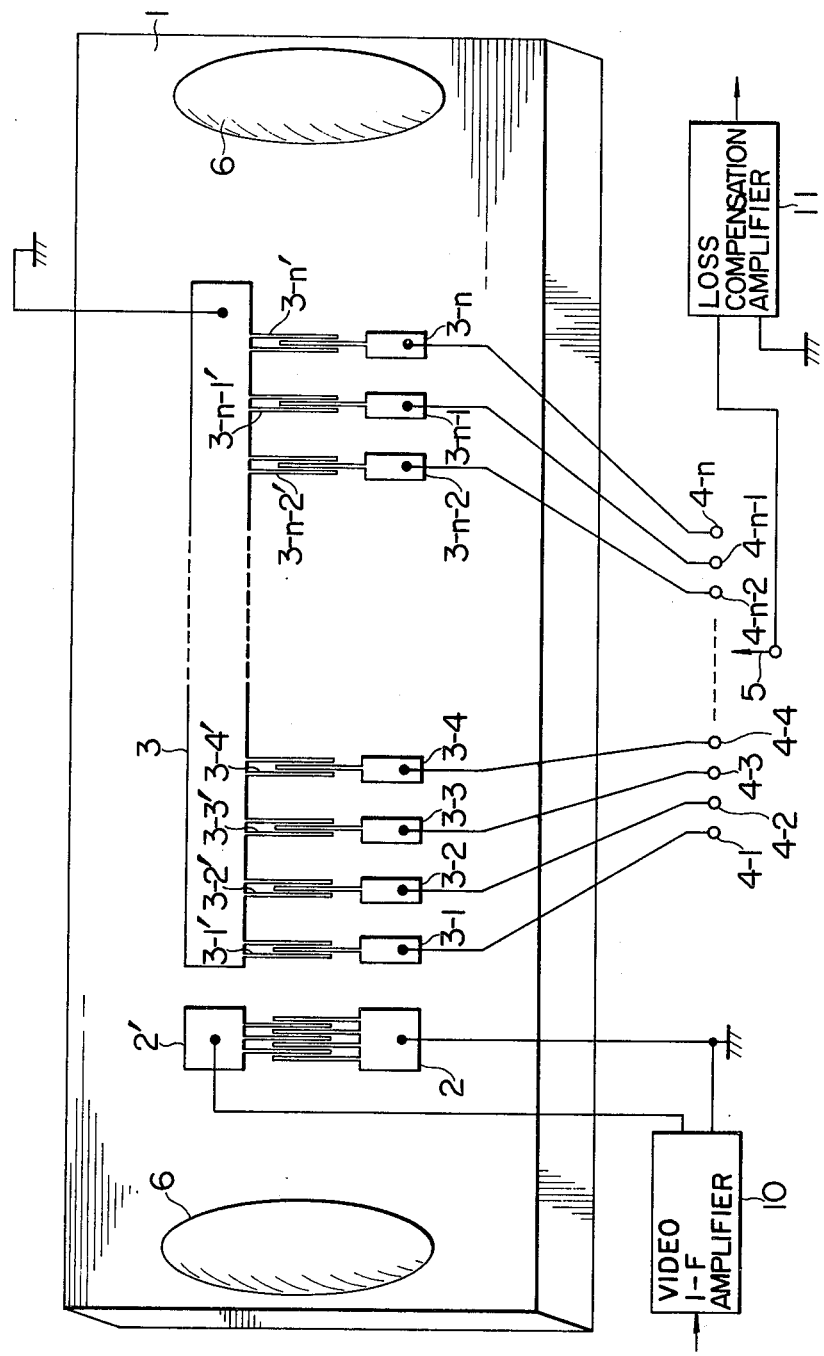
FIGS. 1 and 2 are pictorial perspective representations of variable delay elements to be used in a ghost signal removing system embodying the invention.

In FIG. 1, designated at 1 is a piezoelectric material such as LiNbO$_3$ (Lithium Niobate), LiTaO$_3$ (Lithium Tantalate), PZT (PbZrO$_3$—PbTiO$_3$, mixed sintered material of Lead Zirconate and Lead Titanate), Bi$_{12}$GeO$_{20}$ (Bismuth Germanate), quartz, etc. Designated at 2 and 2' are first interdigitated electrodes to generate an elastic surface wave. These first interdigitated electrodes 2 and 2' are formed by means of deposition on the piezoelectric material 1 in such a fashion that their teeth mutually interleave. One of these interdigitated electrodes is held at ground potential. The required bandwidth of the signal to be delayed is inversely proportional to the number of pairs of teeth of the interdigitated electrodes, so that for delaying a signal of a narrow bandwidth the number of pairs of teeth may be increased.

Designated at 3-1, 3-1', 3-2, 3-2', . . . 3-n, 3-n' (n being a positive integer) are second interdigitated electrodes serving as signal take-out electrodes. The n pairs of interdigitated electrodes 3-1, 3-1' 3-2, 3-2', . . . . 3-n, 3-n' are formed on the piezoelectric material such that the teeth of each pair of electrodes mutually interleave. One interdigitated electrode in each of the n pairs, namely electrodes 3-1', 3-2', . . . 3-n', is connected to a common electrode 3 which is held at ground potential. The other interdigitated electrodes are connected to respective n signal take-out terminals 4-1, 4-2, . . . 4-n.

The first interdigitated electrode pair and second interdigitated electrode pairs are formed on the piezoelectric material with a spacing therebetween and parallel to one another.

The n second interdigitated electrode pairs each consisting of two, mutually interleaving interdigitated electrodes are spaced apart at a fixed interval.

An elastic surface wave, for instance corresponding to a video intermediate-frequency (hereinafter abbreviated as video i-f) signal, is produced at the first interdigitated electrodes 2 and 2'.

The elastic surface wave produced according to the video i-f signal impressed between the first interdigitated electrodes 2 and 2' is propagated along the surface of the piezoelectric material 1 at a constant propagation speed. When each of the second interdigitated electrode pairs is reached by an elastic surface wave which was propagated along the surface of the piezoelectric material 1, a voltage corresponding to the video i-f signal may be produced across that electrode pair, and it may be taken out as a delayed video i-f signal delayed for a certain delay time from the signal take-out terminal connected to the relevant second interdigitated electrode in that pair. At this time, the delay time can be varied by switching the n take-out terminals 4-1, 4-2, . . . 4-n through a switching means 5. Denoting the speed of the elastic surface wave by Vs and the distance between the first interdigitated electrode 1 and a k-th second interdigitated electrode 3-k by Lr the propagation time until the wave reaches the k-th second interdigitated electrode 3-k is given as $$Tr = \frac{Lr}{Vs}$$

The delayed video i-f signal voltage delayed by a certain time which is appropriately selected by switching the n signal take-out terminals through the switching means 5, is led to a loss compensation amplifier 11 for amplification.

Designated at 6 and 6' is a material serving as an elastic surface wave absorber and having viscosity, for instance rubber, wax, macro-molecular organic substance or the like, which is applied to the piezoelectric material for absorbing the surface wave and preventing undesired reflection thereof.

By way of a specific example, with LiNbO$_3$ used as the piezoelectric material 1 and setting four pairs of facing comb teeth as each interdigitated electrode pair with the tooth width and distance between adjacent interleaving teeth set to 15.3 μm, by impressing a video i-f signal at a center frequency of 57 MHz between the first interdigitated electrodes a signal at a center frequency of 57 MHz and with a bandwidth of about 6 MHz is propagated in Y-cut Z propagation along the surface of LiNbO$_3$ at the speed of the elastic surface wave of 3,488 m/sec.

With the above construction, by setting the distance between adjacent ones of the plurality of second interdigitated electrode pairs, distance between electrodes 3-1 and 3-2, 3-2 and 3-3, . . . to 350 μm, the signal generated at the first interdigitated electrode pair can be taken out at the terminal 4-1 connected to the electrode 3-1 in the leading second interdigitated electrode pair after a delay time of 0.1 μ sec. Similarly, it may be taken out at the terminals 4-2, 4-3, . . . 4-n after respective delay times of 0.2 μ sec, 0.3 μ sec, . . . 0.1 × n μ sec.

Figure 2:
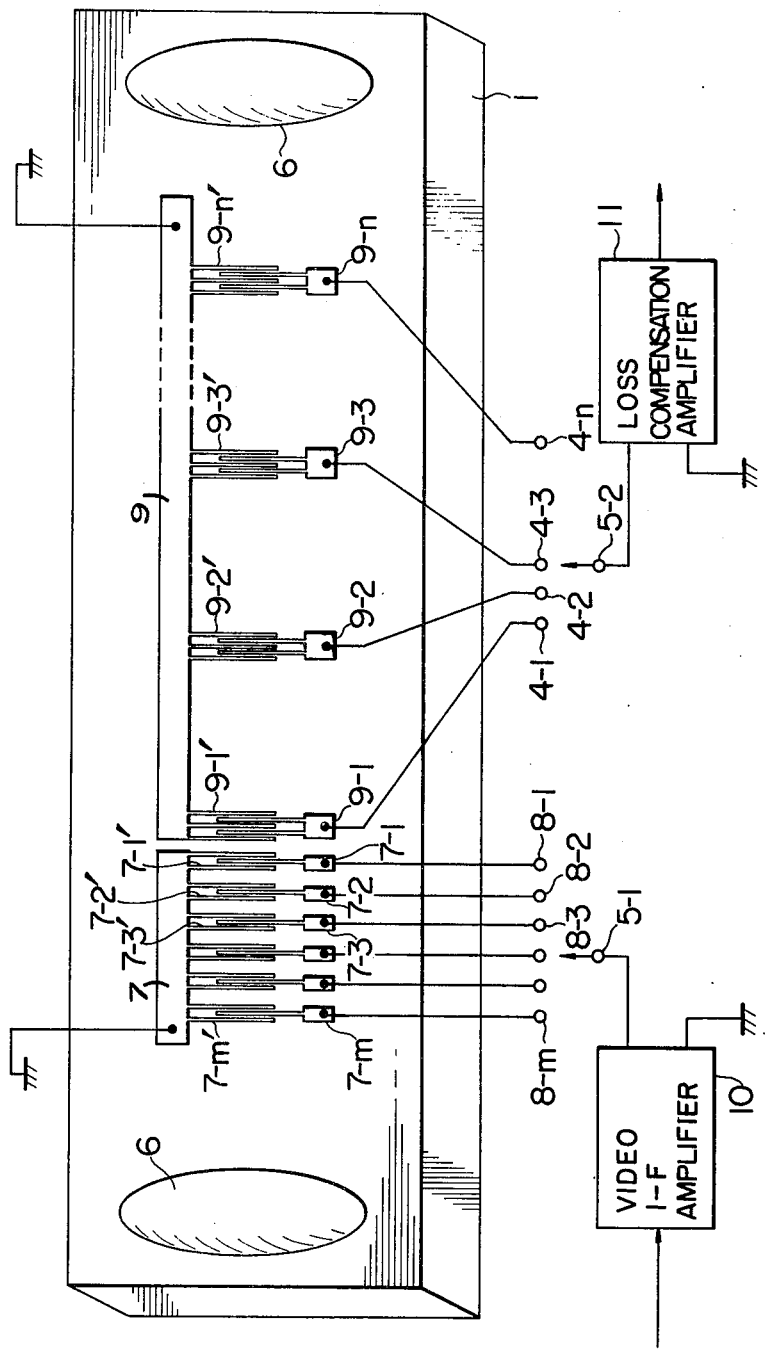

FIG. 2 shows a modification of the FIG. 1 construction utilizing elastic surface wave for use in the ghost signal erasing system according to the invention. In the modification of FIG. 2, a plurality of first interdigitated electrode pairs are provided for the generation of an elastic surface wave, and one electrode in each of the first interdigitated electrode pairs is connected to each signal impression terminal. Further, a plurality of second interdigitated electrode pairs for taking out the delayed signal are provided, and one electrode in each of the second interdigitated electrode pairs is connected to each signal take-out terminal.

In this delay element, both the signal impression terminals and the signal take-out terminals are switched through respective switching means for varying the delay time.

In FIG. 2, designated at 7-1, 7-1', 7-2, 7-2', . . . 7-m, 7-m' are first interdigitated electrodes for the generation of an elastic surface wave. The m pairs of interdigitated electrodes 7-1 and 7-1', 7-2 and 7-2', . . . 7-m and 7-m' are formed on piezoelectric material 1 such that the teeth of pair electrodes mutually interleave. One interdigitated electrode in each of the m pairs, namely electrodes 7-1', 7-2', . . . 7-m', is connected to a common electrode 7 which is held at ground potential. The other interdigitated electrodes are connected to respective m signal impression terminals 8-1, 8-2, . . . 8-n. Designated at 9-1, 9-1', 9-2, 9-2', . . . 9-n, 9-n' are second interdigitated electrodes for taking out the delayed signal. Similar to the first interdigitated electrodes, the n pairs of the second interdigitated electrodes are formed on the piezoelectric material such that the teeth of pair electrodes mutually interleave. Also similar to the first interdigitated electrodes, one interdigitated electrode in each of the n pairs, namely electrodes 9-1', 9-2', . . . 9-n', is connected to a common terminal 9, while the other interdigitated electrodes are connected to respective n signal take-out terminals 4-1, 4-2, . . . 4-n. Adjacent ones of the m first interdigitated electrode pairs are spaced apart by a distance corresponding to a delay time of, for instance, 0.1 μ sec. On the other hand, the spacing of the n second interdigitated electrode pairs is set to correspond to 0.1 ×m μ sec in the case where m first interdigitated electrode pairs are provided at the spacing corresponding to 0.1 μ sec. In the example of FIG. 2, six first interdigitated electrode pairs are provided. The distance between adjacent ones of the second interdigitated electrode pairs, that is, the distance between electrodes 9-1 and 9-2, 9-2 and 9-3, . . . is set to correspond to 0.1 × 6 μ sec. For example, with LiNbO$_3$ used as the piezoelectric material the distance between adjacent ones of the first interdigitated electrode pairs is set to 350 μm, and the distance between adjacent ones of the second interdigitated electrode pairs to 350 × 6 = 2,100 μm.

Designated at 5-1 and 5-2 are switching means, with the switching means 5-1 serving to switch the signal impression terminals and the switching means 5-2 serving to switch the signal take-out terminals. By switching the switching means 5-1 and 5-2 the impressed signal may be delayed for a desired period of time. Table 1 below shows the relation between the delay time and the corresponding combination of selected terminals.

Table 1

|          | 5-1 | 5-2 |          | 5-1 | 5-2 |
|----------|-----|-----|----------|-----|-----|
| 0.1 μ sec | 8-1 | 4-1 | 1.6 μ sec | 8-2 | 4.3 |
| 0.2      | 8-2 | 4-1 |          |     |     |
| 0.3      | 8-3 | 4-1 | 1.8      | 8-6 | 4-3 |
| 0.4      | 8-4 | 4-1 | 1.9      | 8-1 | 4-4 |
| 0.5      | 8-5 | 4-1 | 2.0      | 8-2 | 4-4 |

Table 1-continued

| | 5-1 | 5-2 | | 5-1 | 5-2 |
|---|---|---|---|---|---|
| 0.6 | 8-6 | 4-1 | | | |
| 0.7 | 8-1 | 4-2 | | | |
| 0.8 | 8-2 | 4-2 | | | |
| | | | 2.4 | 8-6 | 4-4 |
| | | | 2.5 | 8-1 | 4-5 |
| | | | 2.6 | 8-2 | 4-5 |
| . | . | . | . | . | . |
| 1.2 | 8-6 | 4-2 | | | |
| 1.3 | 8-1 | 4-3 | | | |
| 1.4 | 8-2 | 4-3 | | | |
| . | . | . | . | . | . |

For example, if it is desired to delay a signal for 0.1 $\mu$ sec, the switching means 5-1 is connected to the terminal 8-1, while connecting the switching means 5-2 to the terminal 4-1. To delay signal for 2.6 $\mu$ sec, the switching means 5-1 and 8-2 are respectively connected to the terminals 5-2 and 4-5. Thus, it will be appreciated that while the variable delay element of FIG. 1 has required 100 terminals to provide for a 0.1 $\mu$ sec step delay time coverage up to 10 $\mu$ sec, the element of FIG. 2 requires only 23 terminals for the same coverage. While the element of FIG. 2 has incorporated six first interdigitated electrode pairs, this number of pairs is by no means limitative and any number of pairs no less than two pairs may of course be incorporated. However, no advantageous effects would be obtained if m is too small or too large.

While the variable delay element for use in the ghost signal erasing system according to the invention has been described in conjunction with FIG. 2, the following points have to be taken into considerations in the actual manufacture:

a. As the substrate material 1, those which have large coefficients of electromechanical coupling representing the extent of their piezoelectric character or sensitivity are preferred to minimize losses that may occur in the eventual delay line; for instance, such materials as $LiNbO_3$, PZT, PCM [$Pb(Mg_{1/3}\cdot Nb_{2/3})\times Ti_yZr_zO_3$, where $x+y+z=1$, in other words, a mixed sintered material of $Pb(Mg_{1/3}\cdot Nb_{2/3}O_3)$, $TiO_3$ and $ZrO_3$], $LiTaO_3$ and $BiGeO_3$ are preferred.

b. The tooth portion of the interdigitated electrode is preferably as thin as possible. This is because thick teeth tend to cause scattering of the surface wave. However, extremely thin teeth will present the problem of increased electric resistance. In these respects, aluminum or gold teeth of the order of 5,000 A to 500 A in thickness are adequate.

c. The portion of the interdigitated electrode than the tooth is preferably as thick as possible in view of minimizing the electric resistance, and a recommendable thickness range is about 3 $\mu$m to 0.5 $\mu$m.

With an aluminum electrode stem with a thickness of this order, ultrasonic bonding of an aluminum lead of the order of 100 $\mu$m to 10 $\mu$m to the electrode is possible.

Figure 3:
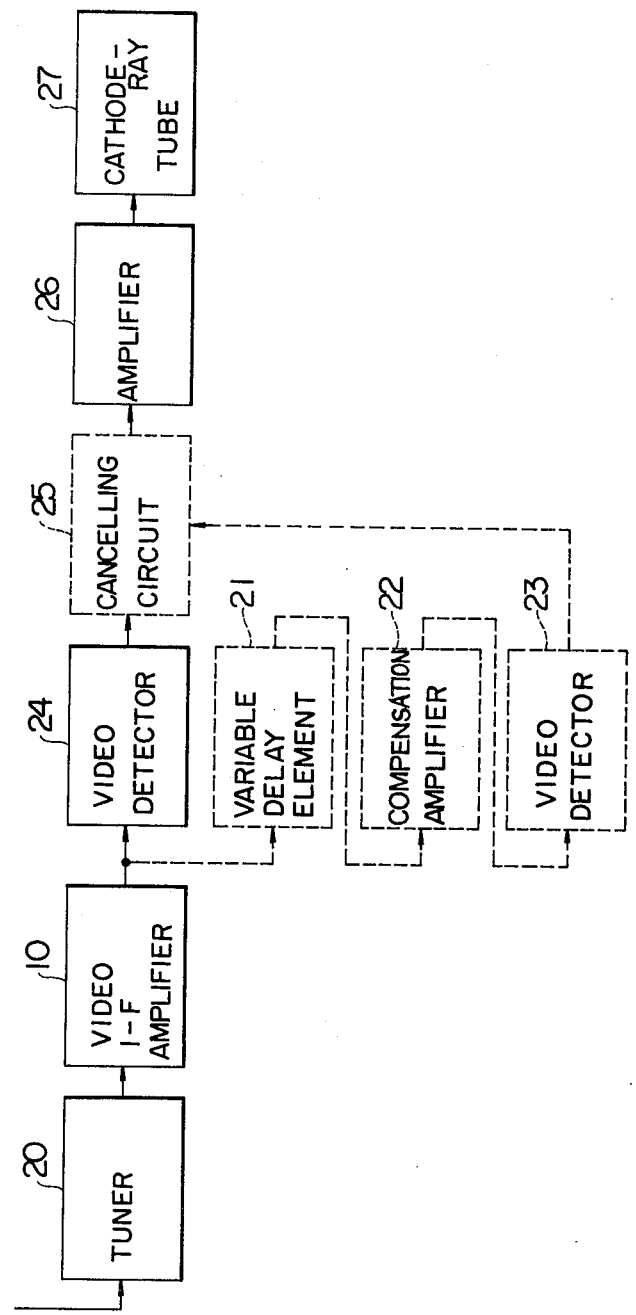
FIG. 3 is a block diagram of an embodiment of the ghost signal removing system according to the invention.

Now, an embodiment of the ghost signal erasing system according to the invention incorporating the variable delay element of FIG. 2 will be described. FIG. 3 shows a block diagram of a television signal receiving system incorporating a ghost signal erasing system embodying the invention.

Figure 4:
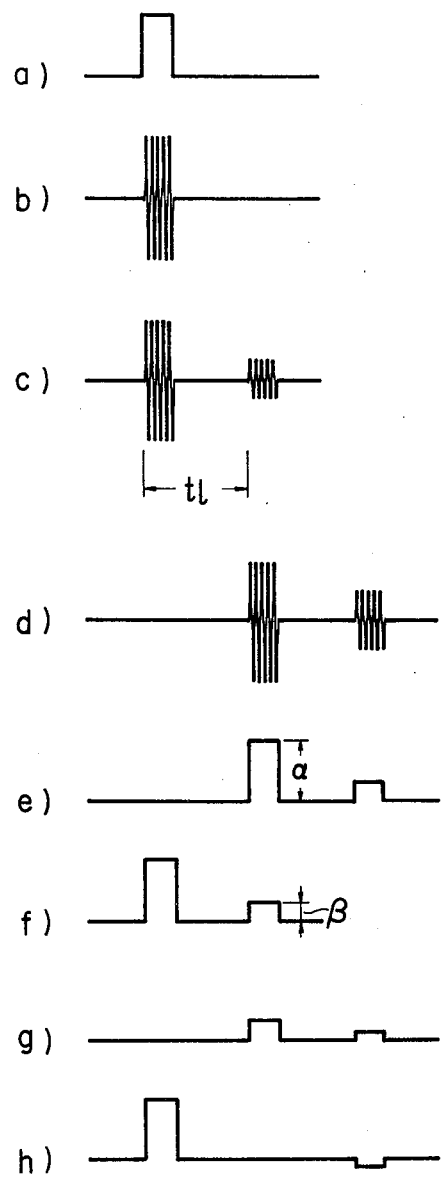
FIG. 4 is a waveform chart illustrating the operation of the same system.

Referring to FIG. 3, the portion indicated by dashed lines is incorporated for the removal of ghosts. FIG. 4 shows output waveforms occurring in some parts of the system of FIG. 3.

Referring to FIG. 3, a television signal received at an antenna is converted into a video i-f signal in a tuner 20 and then separated after amplification in a video i-f amplifier 10. A part of the amplified video i-f signal is passed to a video detector 24 in a normal television receiver circuit. The remaining part of the video i-f signal is applied to a variable delay element 21 utilizing an elastic surface wave. The delayed video i-f signal is then applied to a compensation amplifier 22 which effects compensation for attenuation caused by the delay element 21. This compensation amplifier 22 has a flat amplification characteristic over the band of the video i-f signal and effects amplification to the extent depending upon the attenuation by the delay element 21. When the elastic surface wave delay element is constituted by using a surface wave propagation in the Z direction in Y cut $LiNbO_3$, the attenuation of signal by the delay element amounts to about 20 db and thus the compensation amplifier 22 is required to increase the gain by 20 $db$ by amplification thereby to achieve substantially a flat gain within 3 db variations over the range of video i-f band. The signal from the compensation amplifier 22 is detected in a video detector 23 which is similar to the video detector 24.

If a video signal prior to radiation as an electromagnetic wave from a broadcast station has a waveform as shown at a in FIG. 4, a modulated i-f subcarrier signal as shown at b is obtained from the video i-f amplifier of a television receiver tuned to that station, so long as the transmitted wave is received as unipath reception free from any ghost component. If part of the radiated wave is reflected by a large object such as a building to give rise to a reflected wave, the reflected wave is received after a delay time tl with respect to the direct wave because of a longer propagation path. As a result, the video i-f amplifier output has a waveform as shown at c, which results from the combination of the direct wave and reflected wave. This output c is coupled to a variable delay element 21 as mentioned earlier with FIG. 2 and is delayed there for the period tl, so that the variable delay element 21 produces output as shown at d in FIG. 4. More particularly, the video i-f signal c produced from the video i-f amplifier is coupled through the switching means 5-1 to a selected one of the first electrode pairs in the variable delay element 21. With the video signal coupled to one of the plurality of first interdigitated electrode pairs a corresponding elastic surface wave is produced and propagated along the surface of the piezoelectric material 1. This elastic surface wave propagating along the surface of the piezoelectric material is taken out as an a-c signal from a selected one of the plurality of second interdigitated electrode pairs as selected by the switching means 5-2. The first and second interdigitated electrode pairs are selected respectively through the switching means 5-1 and 5-2 in compliance with the delay time tl of the reflected wave relative to the direct wave. The output d is taken out from the switching means 5-2, and it lags behind the signal c coupled to the switching means 5-1 by the delay time tl. The output d of the variable delay element 21 is amplified by a compensation amplifier 22, whose output is coupled to a video detector 23 for detection to produce an output of a waveform as shown at e in FIG. 4.

Meanwhile, the video i-f signal produced from the video i-f amplifier 10 is also coupled to another video detector 24 for detection there to produce an output of a waveform as shown at $f$ in FIG. 4. The outputs $f$ and $e$ of the respective video detectors 24 and 23 are coupled to a cancelling circuit 25. In the cancelling circuit 25, the output $e$ of the video detector 23 is subjected to level adjustment such as to make the level $\alpha$ of its direct wave component coincide with the level $\beta$ of the reflected wave component of the output $f$ of the video detector 24 to obtain an output $g$. This level adjusted output $g$ is subtractively combined with the output $f$ of the video detector 24 to obtain an output $h$. It will be seen that the output $h$ corresponds to what is obtained by removing the ghost component from the video signal input to the tuner 20 containing the ghost component. While the output $h$ contains a new ghost component of the opposite polarity, denoting the signal level ratio of the reflected wave to the direct wave by $k (=\beta/\alpha)$, the level of the new ghost signal is $k^2$ times the level of the direct wave. For example, if the received video signal contains a ghost component of an amplitude corresponding to 30 percent of that of the direct wave component, the level of the new ghost component introduced into the output $h$ from the cancelling circuit is only 9 percent of that of the direct wave component. Such a ghost has a negligible effect upon the quality of the reproduced picture. The output $h$ of the cancelling circuit is coupled after amplification through a video amplifier 26 to a cathode-ray tube to obtain picture reproduction free from ghosting.

Figure 5:
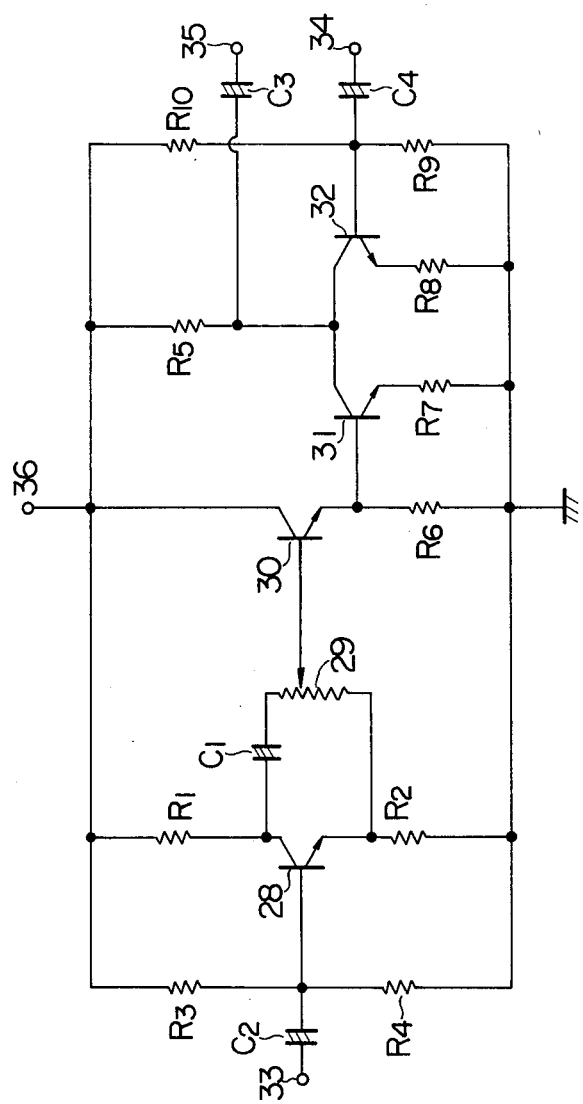
FIG. 5 shows an example of the circuit arrangement of a cancellation circuit shown in FIG. 3.

FIG. 5 illustrates a circuit arrangement of the cancelling circuit 25 in which an input terminal 33 is connected to the video detector 23 whereas an input terminal 34 is connected to receive the output of the video detector 24. From an output terminal 35 an output signal having negligibly cancelled out ghost signal is applied to the video amplifier 26. A terminal 36 is connected to a DC power supply. A signal applied to the input terminal 33 is passed via a capacitor $C_2$ to the base of a transistor 28. Since the emitter and collector of the transistor 28 are connected respectively to load resistors $R_1$ and $R_2$ of the same resistance value, the signals appearing at the emitter and collector are of the same amplitude and opposite polarities. As a result, a signal appearing at a level control 29 is zero at the neutral point, a positive polarity at the side of emitter, and a negative polarity at the side of the collector. Thus, by adjusting the level control 29, it is possible to render the ghost signal and the delayed signal to have the same signal intensity but to have opposite polarities. The signal obtained by the level control 29 is applied to the base of a transistor 31 via a emitter follower circuit of a transistor 30. On the other hand, an ordinarily detected signal applied at the other input terminal 34 is passed to the base of a transistor 32. Since the collectors of the transistors 31 and 32 are connected to a common load resistor $R_5$, the signal applied to the base of transistor 31 and the signal applied to the base of transistor 32 are added to each other and appear at the terminal 35 as an output. Since the signal applied to the transistor 31 is rendered to be the same intensity and of an opposite polarity with respect to the ghost signal in the signal applied to the transistor 32 by adjusting the level control 29, due to the addition mentioned above a ghost signal can be cancelled out.

As has been shown in the foregoing, the invention provides a ghost signal erasing system incorporating a variable delay element, which utilizes elastic surface waves and is small in size and capable of delaying a signal for a long time.

We claim:

1. In a television receiver having a video intermediate frequency amplifier, a ghost signal erasing system comprising
    a first video detector and a variable delay element coupled to the output of said video intermediate frequency amplifier, said variable delay element including
        a piezoelectric medium,
        a plurality of first interdigitated electrode pairs formed on said medium,
        a plurality of second interdigitated tapped-electrode pairs formed on said medium spaced from said plurality of first electrode pairs, and
        switch means coupled to said first and second electrode pairs for selecting different ones of said first and second interdigitated electrode pairs so as to change the combination of first and second electrode pairs, a video intermediate frequency signal applied to a selected one of said first interdigitated electrode pairs causing an elastic surface wave to be generated and propagated along the surface of said piezoelectric medium, said propagated wave being extracted as a delayed video intermediate frequency signal voltage from a selected one of said second interdigitated tapped-electrode pairs, the delay time between application of said video intermediate frequency signal to said selected first electrode pair and the extraction of a delayed video signal from said selected second tapped-electrode pair being determined by the setting of said switch means,
    a second video detector coupled to said variable delay element to detect the delayed output signal thereof, and
    a cancelling circuit coupled to said first and second video detectors to adjust the level and subtractively combine the outputs of said first and second video detectors.

2. A variable delay element comprising
    a piezoelectric medium,
    a plurality of first interdigitated electrode pairs formed on said medium,
    a plurality of second interdigitated tapped-electrode pairs formed on said medium spaced from said first plurality of electric pairs, a video intermediate frequency signal applied to a selected one of said first interdigitated electrode pairs causing an elastic surface wave to be generated and propagated along the surface of said piezoelectric medium, said propagated wave being extracted as a delayed video intermediate frequency signal voltage from a selected one of said second interdigitated tapped-electrode pairs, and
    switch means for selecting different ones of said first and second interdigitated electrode pairs so as to change the combination of first and second interdigitated electrode pairs, thereby varying the delay time.

* * * * *